US006953561B2

United States Patent
Wolfsteiner

(10) Patent No.: US 6,953,561 B2
(45) Date of Patent: Oct. 11, 2005

(54) DEVICE FOR THE SELECTIVE OXIDATION OF A SUBSTANCE STREAM

(75) Inventor: Matthias Wolfsteiner, Kirchheim (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 449 days.

(21) Appl. No.: 10/197,637

(22) Filed: Jul. 16, 2002

(65) Prior Publication Data

US 2003/0053941 A1 Mar. 20, 2003

(30) Foreign Application Priority Data

Jul. 17, 2001 (DE) .......................................... 101 34 647

(51) Int. Cl.⁷ ............................. C01B 3/58; B01J 35/02; B01J 8/02
(52) U.S. Cl. ............................... 423/437.2; 423/213.2; 423/247; 422/211; 422/241; 180/313
(58) Field of Search .................................. 422/211, 241; 423/213.2, 247, 437.2; 180/313, 305

(56) References Cited

U.S. PATENT DOCUMENTS 5,853,674 A * 12/1998 Lesieur ......................... 422/173
6,087,298 A * 7/2000 Sung et al. ................... 502/333

FOREIGN PATENT DOCUMENTS

EP   0 941 663 A1   9/1999
EP   0 955 351 A1   11/1999

* cited by examiner

Primary Examiner—Stanley S. Silverman
Assistant Examiner—Maribel Medina
(74) Attorney, Agent, or Firm—Seed IP Law Group PLLC

(57) ABSTRACT

A device for selective oxidation of a substance stream comprises a selectively active catalyst. For improving the cold-starting characteristics, the device also has an oxidation catalyst that possesses high activity at low temperatures. The selectively active catalyst is applied as a coating onto one or more surfaces of interior walls of the device. A layer of oxidation catalyst is provided in at least the inlet region where the substance stream enters the device, between the layer of selectively active catalyst and the interior walls of the device.

21 Claims, 1 Drawing Sheet

DEVICE FOR THE SELECTIVE OXIDATION OF A SUBSTANCE STREAM

RELATED APPLICATION

This application claims the benefit of German Patent Application No. 10134647.6 filed Jul. 17, 2001, which priority application is hereby incorporated by reference in its entirety.

BACKGROUND OF THE INVENTION

1. Field of the Invention

The invention is generally directed to a device for the selective oxidation of a substance stream, such as a reformate stream, using a selectively active catalyst and an oxidation catalyst, and methods related to the same.

2. Description of the Related Art

EP 0 941 663 A1 describes a selective oxidizer, which is equipped—for the purpose of accelerating the cold-start process and shortening the cold-start time—with a combination of pellets coated with a selectively active catalyst, and with pellets that are coated with catalysts that possess oxidation activity at room temperature. In accordance with various embodiments in the above-mentioned EP publication, the pellets are distributed throughout the entire catalyst chamber, or are placed in the inlet region of chamber, so that during a cold-start of the selective oxidizer various substances will be oxidized at this catalyst and will heat the selective oxidation catalyst with the released thermal energy. This shortens the cold-start time.

EP 0 955 351 A1 describes a design in which seven stages are used to switch from a 100% oxidation catalyst active at room temperature in the inlet area to a 100% selective oxidation catalyst in the outlet area.

The designs set forth in the above-identified EP publications fulfill the well-known requirements of shortening the cold-start time, but they can lead to serious problems during regular operation. For example, since the oxidation catalyst is always present, it generates a large amount of heat during regular operation, which is a disadvantage for the selective oxidation process, since the selective oxidation requires a comparatively narrow temperature range between approximately 200° C. and 300° C. to take place with optimum efficiency. Consequently, during regular operation, a configuration that includes oxidation catalyst requires appropriate cooling or increased cooling at the oxidation catalyst.

A further disadvantage is that the oxidation catalyst not only converts the component of the substance stream that is supposed to be selectively oxidized (e.g., CO), but also other components present in the stream. In applications associated with hydrogen gas generation for fuel cells, it is possible for hydrogen to be oxidized at the oxidation catalyst, which results in some of the hydrogen no longer being available for the fuel cell, and can result in hydrogen inhibiting the desired selective oxidation by excessively heating the selective oxidation catalyst due to its exothermic reaction at the oxidation catalyst. Both of these disadvantages have detrimental effects on the efficiency of the overall system, on the achieved purification quality, and on the degree of carbon monoxide concentration reduction in the reformate gas stream or any other comparable substance stream.

Consequently, there remains a need for a device that can selectively oxidize a substance stream, particularly one that can combine desirable cold-starting characteristics with desirable energy-saving characteristics during regular operation. The present invention fulfills these and other needs, and provides further related advantages.

BRIEF SUMMARY OF THE INVENTION

In brief, a selective oxidation device is provided that has improved cold-starting characteristics, and finds particular application for selective oxidation in a gas generation system for a fuel cell system, for example in a motor vehicle. The device contains an oxidation catalyst layer to facilitate cold-start, and a selective oxidation catalyst layer to effect the desired selective oxidation of one or more components of a substance stream. The oxidation catalyst possesses is active at cold-start temperatures, which are usually between approximately −15° C. and +25° C. This makes it possible to oxidize carbon monoxide, hydrogen or the like at the oxidation catalyst. The generated thermal energy heats a layer of selectively active catalyst, which is situated above the oxidation catalyst layer. In this manner, the entire selective oxidation device can be heated very rapidly to the required operating temperature of approximately 200° C. to 300° C. This is achieved in significant part by the structure of the layers, their arrangement, and by keeping the coatings very thin, so that they represent no or minimal resistance to heat conduction, so that the thermal energy generated in the lower (oxidation catalyst) layer can easily and directly heat the upper (selectively active catalyst) layer.

The layer thickness of the selectively active catalyst is such that, during operation at normal temperatures, almost all selective oxidation processes take place at the selectively active catalyst, and in the event of a cold-start at least some components of the substance stream permeate through the selectively active catalyst and are oxidized at the oxidation catalyst. This makes it possible to ensure that, due to the low activity of the selectively active catalyst at the low temperatures during a cold-start, components of the substance stream can pass through the selectively active catalyst and reach the oxidation catalyst that already possesses a high activity. As soon as the selectively active catalyst has reached its operating temperature due to the thermal energy generated in the oxidation catalyst, the predominant portion of the oxidation processes will take place as selective oxidation at the selectively active catalyst. Essentially no more oxidizable content then reaches the layer of oxidation catalyst located under the selectively active catalyst layer.

The selective oxidation device of this invention is essentially self-regulating with respect to its temperature and energy consumption and, at low temperatures, is heated by various oxidation processes occurring at the oxidation catalyst. As the temperature increases, so does the activity of the selectively active catalyst, such that less and less oxidizable components reach the oxidation catalyst layer. Activity is thus shifted from the lower oxidation catalyst layer to the upper selectively active catalyst layer. After reaching its operating temperature, the oxidation catalyst layer is thus, in one embodiment, no longer supplied with oxidizable substances. This stops or at least strongly reduces the production of heat at the oxidation catalyst layer.

In an alternative embodiment, the oxidation catalyst layer may also be only selectively active for particular oxidation reactions, provided that it is active at low temperatures. However, a layer that possesses more general oxidative activity will certainly offer advantages with respect to the obtainable substance conversion rate, to optimizing the thermal yield, and thus to shortening the cold-start time.

This invention permits oxidation catalyst layer to no longer operate during regular operation of the selective oxidation device. As a result, no portion of the substance stream, which is required downstream, is wasted in the generation of unwanted thermal energy. In addition, increased cooling due the to presence of an oxidation catalyst is no longer necessary, since only regular cooling is required to maintain the temperature level required for the selective oxidation at the selectively active catalyst.

The present invention makes it possible in an especially practical way to optimize the efficiency, the conversion rate, and the substance yield. Since no thermal energy is produced at the oxidation catalyst during regular operation, a sufficiently large quantity of oxidation catalyst can be provided without the unwanted side effect of excess thermal heating. This comparatively large quantity of oxidation catalyst allows an extremely rapid heating of the selectively active catalyst, which drastically shortens the cold-start time.

In a further embodiment, the device is constructed in a plate-reactor design, whereby the coating is applied to the sides of the plates that face the oxidation chamber. This design finds particular application for the selective oxidation stage in a gas generation system for a fuel cell system for mobile use (e.g., in a motor vehicle). The plate design, which is suitable for catalyst coatings, offers several advantages, especially due to the very compact design that is achievable.

These and other advantages will be evident upon reference to the attached Figures and following detailed description.

BRIEF DESCRIPTION OF THE SEVERAL VIEWS OF THE DRAWING(S)

DETAILED DESCRIPTION OF THE INVENTION

Figure 1:
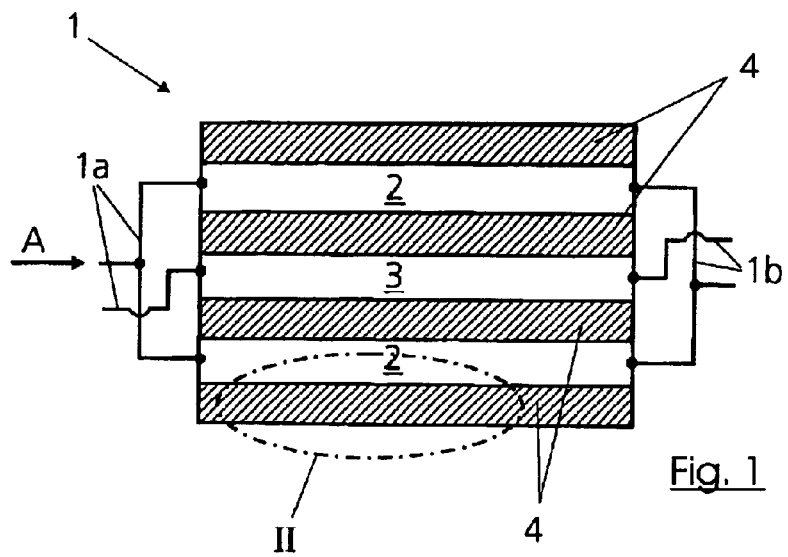
FIG. 1 is a schematic cross section through a plate reactor for the selective oxidation of a substance stream.

Referring to FIG. 1, a section of a plate reactor or heat exchanger 1 is disclosed which consists of selective oxidation chambers 2 and a cooling chamber 3 (which are arranged on top of each other in an alternating fashion), and plates 4 arranged in between the chambers. Each of the chambers connects an inlet region 1a, where the substance stream enters the chamber, with an outlet region 1b where the substance stream exits the chamber. The remainder of the plate reactor 1 is of a standard design, and thus no further elaboration regarding the same is presented herein.

Figure 2:
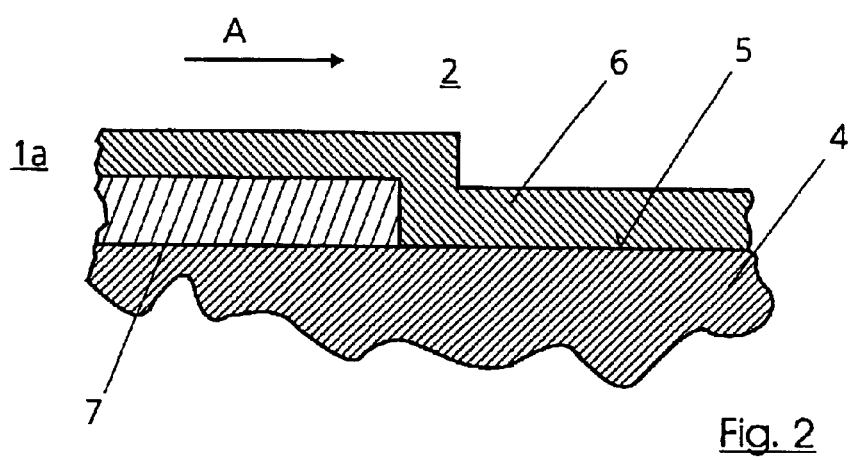
FIG. 2 is a schematic illustration of catalyst layers according to the invention.

Referring to FIG. 2, a section of a plate reactor 1 is depicted, showing part of a plate 4 and selective oxidation chamber 2 above the plate. The side of plate 4 that faces selective oxidation chamber 2 (i.e., interior wall 5 of the selective oxidation chamber) is provided with a coating 6 of selectively active catalyst, for example a catalyst comprising noble metals, such as platinum, ruthenium, palladium or similar elements. A coating layer 7 of oxidation catalyst is located between plate 4 and coating layer 6 of selectively active catalyst in the inlet region 1a where the substance stream (depicted by arrow A in FIGS. 1 and 2) flows into oxidation chamber 2 of plate reactor 1.

When plate reactor 1 undergoes a cold-start (i.e., when the reactor is at a temperature that is usually between approximately −15° C. and +25° C.), the selectively active catalyst in the coating layer 6 is generally not active, since it has an optimum operating temperature of between approximately 200° C. and 300° C. During regular operation, the temperature is maintained in this range by a cooling medium in the cooling chamber 3 of plate reactor 1 as shown in FIG. 1.

The oxidation catalyst in the coating layer 7 is active during a cold start. The components in the stream that are not reacted at layer 6 due to the lack of catalyst activity at the low temperature permeate through layer 6 to layer 7, where they are oxidized. Not only the component intended for the selective oxidation in the reactor (e.g., CO) is oxidized in this process, but also other components of the substance stream may be oxidized, for example hydrogen in the case of the illustrated embodiment example (i.e., application as a reformate gas purification system for a fuel cell). The exothermic oxidation at the oxidation catalyst layer 7 rapidly and effectively heats the surrounding elements (i.e., plate 4 and the selective oxidation catalyst of coating layer 6 that is in immediate contact with the coating layer 7).

During normal operation (i.e., when the plate reactor 1 has reached its operating temperature of approximately 200° C. to 300° C., which is kept constant or within a range suitable for optimum activity of the selectively active catalyst by a cooling medium in cooling chamber 3), the activity of the selectively active catalyst of the coating layer 6 is sufficiently high such that essentially no oxidizable components (e.g., CO or $H_2$), reach the oxidation catalyst of coating layer 7, since this layer 7 is completely covered by coating layer 6. This prevents further heating of the oxidation catalyst, and thus overheating of inlet region 1a where substance stream A flows into oxidation chamber 2. Coating layer 7 does not therefore further increase the amount of heat that has to be dissipated by the cooling cycle in cooling chamber 3 during normal operation. Thus, cooling capacity remains essentially constant, which is desirable for the selectively active catalyst in coating layer 6.

Figure 3:
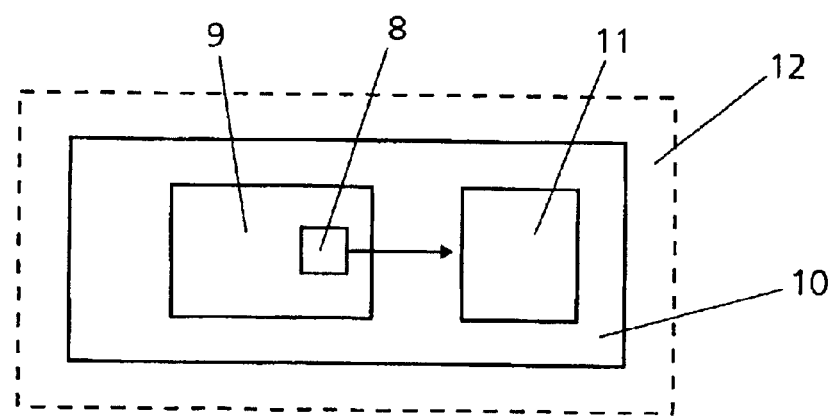
FIG. 3 is a schematic representation of a gas generation system for a fuel cell system.

As illustrated schematically in FIG. 3, the above-described plate reactor 1 is especially suitable as a selective CO oxidation stage or gas purification device 8, which in a typical embodiment is arranged in a gas generation system 9 for a fuel cell system 10 with a fuel cell 11. The small, compact and light-weight design, and especially the cold-starting capability, can be especially advantageous if the fuel cell system 10 is used in a motor vehicle 12.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for selective oxidation of a substance stream, comprising the step of introducing the substance stream into a device having an oxidation chamber with an interior wall, the device having a selectively active catalyst layer on a surface of the interior wall, and an oxidation catalyst layer with high activity at low temperatures, wherein the oxidation catalyst layer is disposed between the selectively active catalyst layer and the surface of the interior wall at least in the substance stream inlet region of the oxidation chamber.

2. The method of claim 1 wherein the substance stream is a reformate stream and the method is for selective oxidation of carbon monoxide in the reformate stream to produce a hydrogen-containing fuel stream for a fuel cell.

3. A device for the selective oxidation of a substance stream, the device having an oxidation chamber with an interior wall, comprising:

a selectively active catalyst layer on a surface of the interior wall; and an oxidation catalyst layer having higher activity than the selectively active catalyst at low temperatures;

wherein the oxidation catalyst layer is disposed between the selectively active catalyst layer and the surface of the interior wall at least in the substance stream inlet region of the oxidation chamber.

4. The device of claim 3 wherein at least one of the selectively active catalyst layer and the oxidation catalyst layer comprise a noble-metal catalyst.

5. The device of claim 4 wherein the noble-metal catalyst comprise platinum, ruthenium or palladium.

6. The device of claim 3 wherein the selectively active catalyst layer is active at an operating temperature ranging from 200° to 300° C.

7. The device of claim 3 wherein the selectively active catalyst layer is capable of oxidizing carbon monoxide within the substance stream.

8. The device of claim 3 wherein the oxidation catalyst layer is active at an operating temperature ranging from −15° to 25° C.

9. The device of claim 3 wherein the oxidation catalyst layer is capable of oxidizing carbon monoxide and at least one additional oxidizable component within the substance stream.

10. The device of claim 9 wherein the at least one additional oxidizable component is hydrogen.

11. The device of claim 3 wherein the selectively active catalyst is sufficiently reactive such that the substance stream is not oxidized by the oxidizing layer during operation at a temperature ranging from 200° to 300° C.

12. The device of claim 3 wherein the selectively active catalyst has a thickness such that selective oxidation occurs at the selectively oxidized catalyst during operation at a temperature ranging from 200° to 300° C.

13. The device of claim 3 wherein at least a portion of the substance stream diffuses through the selectively active catalyst layer and is oxidized at the oxidation catalyst during operation at a temperature ranging from −15° to 25° C.

14. The device of claim 3 wherein the device is a plate reactor.

15. The device of claim 14 wherein the selectively active catalyst layer and oxidation layer are applied to a surface of a plate, the plate forming at least a portion of the interior wall of the oxidation chamber.

16. The device of claim 3 wherein the device is a component of a gas generation system for a fuel cell.

17. The device of claim 16 wherein the gas generation system of a fuel cell is a component of a motor vehicle.

18. A gas generation system comprising the device of claim 3.

19. A gas generation system for a fuel cell comprising the device of claim 3.

20. A motor vehicle comprising a device of claim 3.

21. The device of claim 3 further comprising at least one cooling chamber adjacent the oxidation chamber.

* * * * *